(12) United States Patent
Korte et al.

(10) Patent No.: US 11,619,253 B2
(45) Date of Patent: *Apr. 4, 2023

(54) NAIL FOR USE IN NAIL SETTING TOOL

(71) Applicant: RAIMUND BECK NAGELTECHNIK GMBH, Mauerkirchen (AT)

(72) Inventors: Hans Korte, Wismar (DE); Stefan Siemers, Burghausen (DE)

(73) Assignee: Raimund Beck Nageltechnik GmbH, Mauerkirchen (AT)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,563

(22) Filed: Jan. 25, 2022

(65) Prior Publication Data
US 2022/0145920 A1 May 12, 2022

Related U.S. Application Data

(63) Continuation of application No. 16/302,438, filed as application No. PCT/EP2018/054961 on Feb. 28, 2018, now Pat. No. 11,242,878.

(30) Foreign Application Priority Data

Mar. 23, 2017 (DE) .......................... 102017106335.8
Mar. 29, 2017 (DE) .......................... 102017106705.1

(51) Int. Cl.
*F16B 15/08* (2006.01)
*F16B 15/02* (2006.01)
*F16B 19/14* (2006.01)

(52) U.S. Cl.
CPC .............. *F16B 15/02* (2013.01); *F16B 15/08* (2013.01); *F16B 19/14* (2013.01)

(58) Field of Classification Search
CPC ........ F16B 15/08; F16B 13/005; F16B 13/00; F16B 15/0092; F16B 15/0053;
(Continued)

(56) References Cited

U.S. PATENT DOCUMENTS

| 159,777 A | 2/1875 | Sturtevant |
| 1,492,029 A | 4/1924 | Glardon |

(Continued)

FOREIGN PATENT DOCUMENTS

| CN | 101589238 A | 11/2009 |
| CN | 202108254 U | 1/2012 |

(Continued)

OTHER PUBLICATIONS

Albers, Centers for Disease Control and Prevention, "First NIOSH Comic Helps Dispel Internet Myth", Jul. 16, 2013. http://blogs.cdc.gov/niosh-service-blog/2013/07/16/nail.gun-comic/.

(Continued)

*Primary Examiner* — Gary W Estremsky
(74) *Attorney, Agent, or Firm* — Calderon, Safran & Cole P.C.

(57) ABSTRACT

A nail for a nail setting tool comprises a predominantly lignocellulosic material. The nail has a nail shank, at the front end of which is a nail tip in the form of a conical round tip. At the rear end region is a head region. The tip angle of the nail tip is >40°.

18 Claims, 2 Drawing Sheets

(58) Field of Classification Search
CPC .............. F16B 15/0046; F16B 15/003; F16B 15/0023; F16B 15/0015; F16B 15/0007; F16B 15/00; F16B 15/04; F16B 15/02
USPC ................ 411/487, 493, 494, 496, 498, 499
See application file for complete search history.

(56) References Cited

U.S. PATENT DOCUMENTS

| | | | |
|---|---|---|---|
| 2,200,385 A | 5/1940 | Eich | |
| 3,204,265 A * | 9/1965 | Klose | B21K 27/06 |
| | | | 470/58 |
| 3,254,301 A * | 5/1966 | McGrath | G01R 31/2632 |
| | | | 324/626 |
| 3,338,396 A | 8/1967 | Powers | |
| 3,342,327 A | 9/1967 | Newton | |
| 3,357,761 A | 12/1967 | Langas et al. | |
| 3,862,685 A | 1/1975 | Mosetich et al. | |
| 3,915,299 A * | 10/1975 | Miyaoku | F16B 15/08 |
| | | | 411/907 |
| 4,433,949 A * | 2/1984 | Hallock | B21G 3/12 |
| | | | 470/159 |
| 4,637,768 A * | 1/1987 | Rabe | F16B 15/00 |
| | | | 411/487 |
| 5,143,501 A | 9/1992 | Leistner et al. | |
| 5,547,325 A | 8/1996 | Tucker et al. | |
| 5,615,985 A | 4/1997 | Rose et al. | |
| 6,254,301 B1 | 7/2001 | Hatch | |
| 6,557,703 B1 * | 5/2003 | Leitner | F16B 15/08 |
| | | | 206/338 |
| 6,896,135 B2 * | 5/2005 | Leitner | B25C 1/02 |
| | | | 206/338 |
| 7,395,925 B2 * | 7/2008 | Sutt, Jr. | F16B 15/08 |
| | | | 206/338 |
| 7,765,672 B2 | 8/2010 | Clinch et al. | |
| 7,950,129 B2 * | 5/2011 | Clinch | B29C 66/112 |
| | | | 29/521 |
| 9,239,069 B2 * | 1/2016 | Breyer | F16B 13/142 |
| 11,242,878 B2 | 2/2022 | Korte et al. | |
| 2006/0060263 A1 * | 3/2006 | Inoue | B27J 1/00 |
| | | | 144/353 |
| 2008/0193257 A1 * | 8/2008 | Shelton | F16B 15/06 |
| | | | 411/487 |
| 2017/0191518 A1 | 7/2017 | Siemers et al. | |
| 2018/0017092 A1 * | 1/2018 | Hasegawa | F16B 35/065 |

FOREIGN PATENT DOCUMENTS

| | | |
|---|---|---|
| CN | 2408292 Y | 11/2020 |
| DE | 4324743 A1 | 1/1995 |
| DE | 19620273 A1 | 11/1997 |
| EP | 2540781 A1 | 1/2013 |
| JP | S4845056 U | 6/1973 |
| WO | WO9420273 A1 | 9/1994 |
| WO | WO2016180900 A1 | 11/2016 |

OTHER PUBLICATIONS

Wikipedia.org, "Power-actuated tool", page last modified Mar. 31, 2016. https://en.wikipedia.org/wiki/Powder-actuated_tool.

* cited by examiner

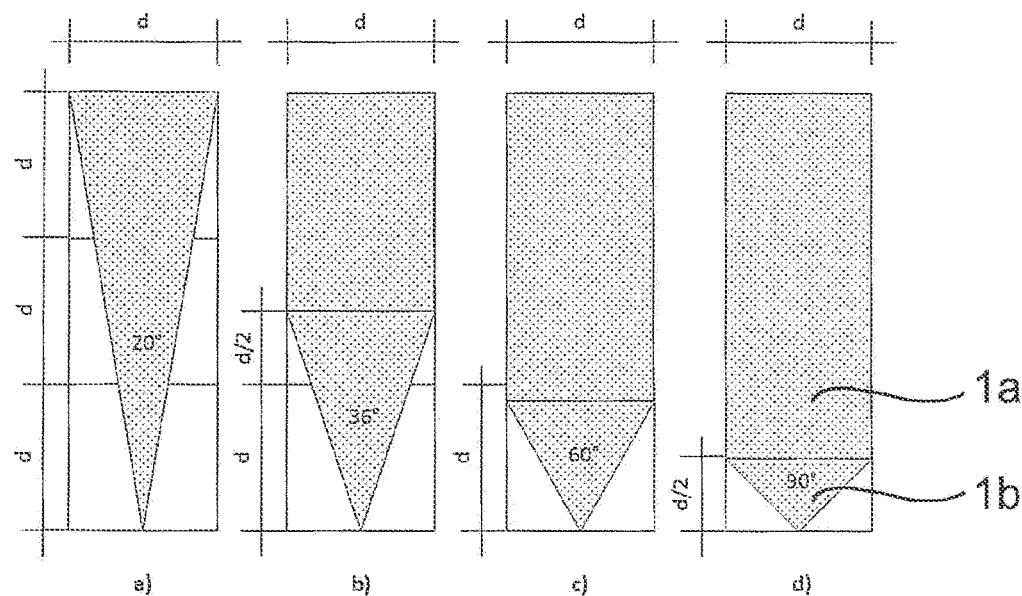
Fig. 1
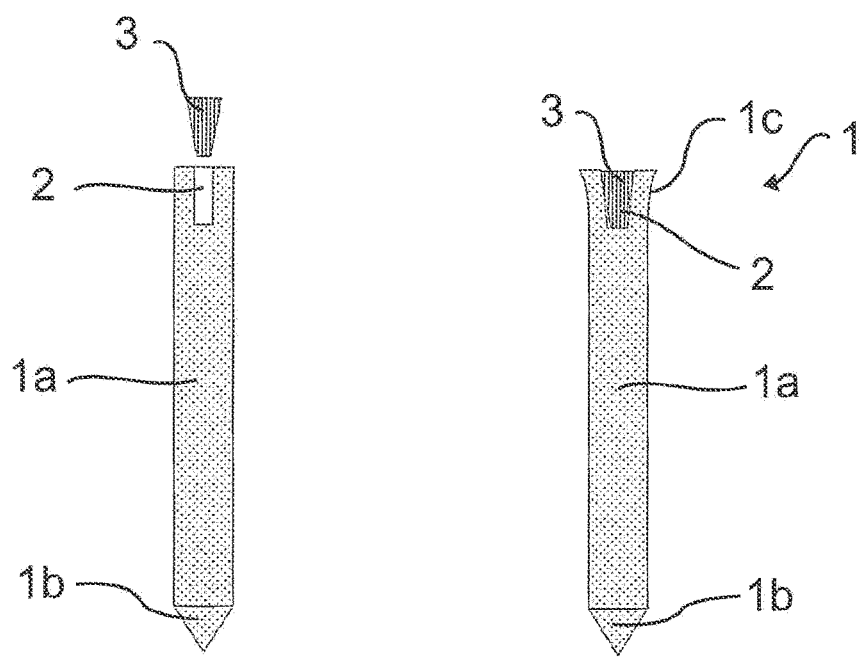
Fig. 2a                    Fig. 2b

NAIL FOR USE IN NAIL SETTING TOOL

CROSS-REFERENCE TO RELATED APPLICATIONS AND CLAIM TO PRIORITY

This application is a continuation of application Ser. No. 16/302,438, filed Nov. 16, 2018, now U.S. Pat. No. 11,242,878, which was a national stage application of International Application No. PCT/EP2018/054961 filed Feb. 28, 2018, which claims priority to German Patent Application Nos. 102017106335.8 filed Mar. 23, 2017 and 102017106705.1 filed Mar. 29, 2017, the disclosures of which are incorporated herein by reference and to which priority is claimed.

FIELD OF THE INVENTION

The present invention relates to a nail, in particular for use in a nail setting tool, which consists of a predominantly lignocellulosic material and has a nail shank at the front end of which a nail tip in the form of a conical round tip is provided, and at the rear end region of which a head region is formed. Furthermore, the invention relates to a nail strip comprising a plurality of such nails which are inserted into corresponding openings of a punched tape.

BACKGROUND OF THE INVENTION

Nails have been known for a long time as connection means. They are mainly made of metal, e.g. steel, aluminium, copper, etc. However, metal nails have disadvantages. Despite corrosion protection measures such as galvanizing, steel nails tend to rust under unfavourable conditions, especially when acidic conditions prevail in the nailed material. This applies in particular to tannin-rich woods, which are used outdoors because of their durability, e.g. on facades and terraces. Weathering can cause unwanted dark to black discolouration of the nail areas. A remedy by using stainless steel grades is possible but very costly. A further disadvantage is that the recycling of wood products interspersed with steel nails is expensive.

For this reason, nails made of wood or woody plant material such as bamboo are used as an alternative. For a long time such wooden nails could only be used if the substrate to be nailed was previously provided with a hole into which the nail was driven. Recent developments, however, allow nails made of wood or wood-like, predominantly lignocellulosic materials to be inserted directly into wood with the aid of nail setting tools such as pneumatic nailers without pre-drilling the wood material. Reference should be made in particular to WO 2016/180900 A1 of the applicant, from which a nail strip for use in a nail setting tool is known, the nails of which consist of wood or wood-based materials and are connected to one another by connecting means, which are automatically sheared off when the nails are set. The nail tip of the nail is conical in shape, whereby the ratio of the length of the nail tip to the smallest thickness of the nail shank is between 1.5 and 3.

It has been shown that this nail tip formation can lead to splitting of the components to be joined when the nails are set, if these consist of anisotropic building materials such as wood. Another disadvantage is that the production of the nail strips by pressing and/or milling is laborious.

SUMMARY OF THE INVENTION

The task of the present invention is therefore to provide a nail of the type mentioned above that can also be driven into wood-based materials without the risk of splitting them.

This task is solved by a nail of the type mentioned above having a tip angle of the nail tip >40°. The tip angle of the nail tip is preferably in the range of 45° and 60°, with an appropriate angle of 45° or 60°. However, larger angles such as 90° are also possible.

It has been shown that nails having tip angles in the indicated ranges and in particular greater than 50° have a significantly lower splitting effect on nailed components than nails with a tip angle smaller than 20°, for example.

Although nails made of woody plant material have an increased pull-out resistance compared to those made of steel of the same dimensions and therefore do not require a head in most cases, there are applications in which not only the pull-out resistance but also the pull-through resistance is important. In order to increase the pull-through resistance, but to maintain the production advantages of pin-like nails compared to nails with a head, an embodiment of the invention provides that the head area is thickened relative to the nail shank and widens continuously, in particular towards the free end of the nail.

Likewise, at least one recess extending in the axial direction of the nail shank may be provided in the upper end face of the head region, which recess is designed such that a wedge can be driven axially into it in order to press the material webs of the head region present adjacent to the recess outwards. Expediently the at least one recess is slot-shaped and penetrates the head area from one edge area to the opposite edge area. In particular, only a single slit-shaped recess is provided, which passes through the head area centrally and cuts the longitudinal axis of the nail shank.

In this embodiment, a wedge is driven axially into the recess after a nail has been driven or driven into a substrate, so that the material webs adjacent to the recess are pressed apart. This causes the entire head area to be deformed outwards, resulting in increased contact pressure against the substrate material. If this is soft enough, the substrate material is even compressed. In this case the head region and the corresponding section receive a slight cone shape similar to that of a screw with a countersunk head through the nail channel section formed in the substrate material. The higher contact forces in the head area and the conical shape significantly increase the pull-through resistance of the nails.

The depth of the recesses/slits can be selected variably, but should be dimensioned so that the adjacent material webs of the head region can be sufficiently pressed apart. For this purpose, according to an embodiment of the invention, it is provided that the recess extends from the upper end face of the head region of the nail over an axial length of at least 3 mm, in particular at least 4 mm and preferably at least 5 mm into the head region.

In a further embodiment of the invention, it is intended that several longitudinal grooves running parallel to each other in the longitudinal direction of the nail shank, preferably parallel to the longitudinal axis of the nail shank, are formed in the outer circumferential surface of the nail shank. The longitudinal grooves can extend over the entire length of the nail shank and be evenly distributed along the circumference of the nail shank. The shape of the longitudinal grooves can be freely chosen. However, according to one embodiment of the invention, it is intended that they are in the form of notches with an approximately triangular cross-section.

Because the cylindrical shank is not smooth, but ribbed with a star-shaped cross-section, the pull-out resistance of the nails is further increased.

The nail may consist of wood and/or a wood material, in particular an organically bonded wood material, preferably a resin-bonded laminated wood or a resin-bonded fibre composite material which contains lignosecellulosic fibres from annual plants.

It has been shown that good results are achieved if the organically bonded wood material contains phenolic resin as a synthetic resin. In particular, the organically bonded wood-based material should contain synthetic resin in an amount of at least 30% by weight, in particular at least 35% by weight, with the synthetic resin content preferably being 40% by weight.

In a preferred manner, the nails according to the invention consist of a material with a density >0.65 g/cm$^3$, in particular a density >0.85 g/cm$^3$ and preferably a density >1.0 g/cm$^3$, the density being in particular 1.3 g/cm$^3$.

This means that deciduous woods can be used as a material for the nails according to the invention. Hard woods include deciduous woods with densities from 0.65 g/cm$^3$, such as copper beech (*Fagus sylvatica*), hornbeam (*Carpinus betulus*), maple (*Acer pseudoplatanus* or *A. platanoides*), preferably deciduous woods with densities greater than 0.85 g/cm$^3$, such as e.g. pernambuc (*Caesalpinia echinata*), bangkirai (*Shorea* ssp.) or some types of rosewood (*Dalbergia* ssp, *Machaerium* ssp.), in particular preferably deciduous woods with densities greater than 1.0 g/cm$^3$, such as bongossi (*Lophira alata*) or lignum (*Guaiacum* ssp.).

Suitable wooden materials that can be produced without the addition of binding agents include compressed woods with densities greater than 0.65 g/cm$^3$, in particular with densities greater than 0.85 g/cm$^3$ and preferably with densities greater than 1.0 g/cm$^3$. These can be produced, for example, according to WO94/20273 A.

Non-compressed veneer layer woods and plywoods made of types of wood with sufficient density (see above) are suitable wooden materials that are produced with the addition of binding agents. The commercially available veneer layer woods with sufficient density include e.g. BauBuche made by Pollmeier Massivholz GmbH & Co. KG, Creuzburg with a density of 0.68 g/cm$^3$. Plywoods with veneer layers of equal thickness—so-called multiplex boards—made of beech or birch with densities of ≥0.7 g/cm$^3$, are offered by various manufacturers such as e.g. UPM Plywood, Lahti, Finland. The preferred wooden materials with portions of binding agent include compressed veneer layer woods, compressed laminated wood and plywoods, e.g. made of beech veneer with average to high compression with densities of 1.1 g/cm$^3$ to 1.4 g/cm$^3$, such as e.g. synthetic resin compressed wood according to DIN 7707.

Structurally very similar to the wooden materials are compressed and glued materials made of woody plant material, e.g. composed of monocotyledons that include, among others, tissue from palm and bamboo growth. Compressed bamboo products are known, for example, under the designation CoBAM (compressed Bamboo). CoBAM has densities of 0.95 to 1.25 g/cm$^3$.

Generally, the nail shank can have any cross-section. For example, it can be oval or polygonal. In a preferred manner, however, the nail shank has a circular diameter. Preferably the diameter of the nail shank or the smallest nail thickness is between 2 mm and 8 mm for an oval or polygonal nail, especially between 3.5 and 6 mm and preferably between 4 and 5 mm.

According to a further embodiment of the invention it is intended that the nails have a nail head in the form of a semi-lens-shaped dome which projects radially outwards with respect to the shank axis. However, the nail shank is preferably cut off at its end opposite the nail tip at an angle of 90° to the shank axis.

The nail length (head+shank+tip) usually varies between 20 mm and 90 mm, in particular between 30 mm and 70 mm, preferably between 40 mm and 60 mm.

The nails according to the invention are preferably produced individually and then magazined. They can be loaded into a nail setting tool either individually or in bulk via a storage container which feeds the nails to a nail setting tool—arranged according to the one-sided alignment of the nail tips. Nails are preferably magazined in coils with punched tape into which the nails are inserted. During insertion, the nails are pushed out of the punched tape without shearing off the fastener, in this case the punched tape. The structure of the perforated tape remains intact and is not shot into the components or distributed around the work area in the form of fragments, as is the case with sheared off fasteners. The undamaged punched tape can either be disposed of as a whole or reused.

The nails according to the invention can be used to be nailed in by hand. Alternatively, they can also be shot into a substrate using a nail setting tool, for example a pneumatic nailer.

BRIEF DESCRIPTION OF THE DRAWINGS

With regard to further advantageous embodiments of the invention, reference is made to the subclaims and the following description of an embodiment with reference to the enclosed drawing. In the drawing shows:

FIG. 1 the front end area of nails with different nail tips in front view,

FIG. 2*a* an embodiment of an inventive nail with a slit-shaped recess provided at the head area, FIG. 2*b* the nail from FIG. 2*a* with a wedge driven into the slot-shaped recess, FIG. 3 a possible cross-section of the nail shank of a nail according to the invention, and FIG. 4 an alternative embodiment of a cross-section of the nail shank.

DETAILED DESCRIPTION OF THE PREFERRED EMBODIMENT(S)

Figure 3:
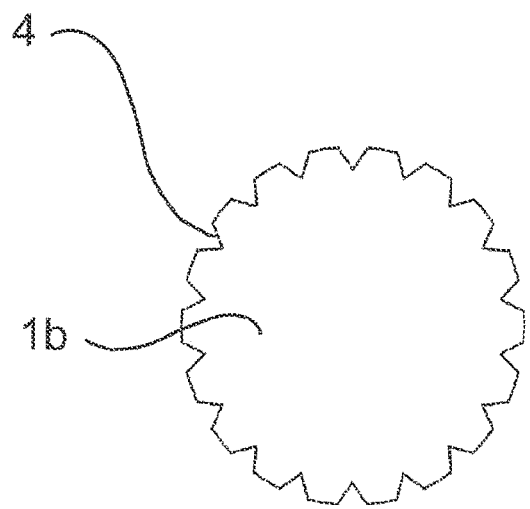

FIGS. 2*a* and 2*b* schematically show a nail 1 according to this invention. The nail consists mainly of a lignocellulosic material. In the present case it consists of a synthetic resin-bonded laminated wood which contains 35% by weight phenolic resin as synthetic resin and thus has a density of more than 1 g/cm$^3$, specifically just under 1.3 g/cm$^3$.

The nail 1 has a nail shank 1*a*, at the lower end of which a nail tip 1*b* is formed with a circular cross-section, i.e. a conical round tip. The nail tip 1*b* has an axial length which is approximately as large as the diameter of the nail shank 1*a*, so that the tip angle of the nail tip 1*b* is 60°.

As shown in FIG. 1*d*, the tip angle can also be 90°, for example. It is essential that it is larger than 40° so that the splitting effect on nailed components is smaller than with nails whose tip angle is smaller, for example at 20°, as shown in FIG. 1*a*.

The upper end region of the nail shank 1*a* is cut off perpendicular to the longitudinal axis of the nail. Thus the nail 1 has a head region 1*c*, which has the same cross-section as the nail shank 1*a*. As can be seen in the drawing, the head region 1c is further provided with a slot-shaped recess 2 which extends axially from the upper end face of nail 1 over a length of several millimeters into the head region 1c or the nail shank 1a along a longitudinal central plane of the nail 1 and penetrates the head region 1c or the nail shank 1a from one edge region thereof to the opposite edge region thereof. A wedge 3 can be driven into the recess 2 after or before the nail 1 is driven into a component or a substrate, so that the webs of material limiting the recess 2 are pressed apart and the head region 1c widens as indicated in FIG. 2b. The expansion increases the pressing forces between the head area 1c and the component into which the nail 1 with the head area 1c is/is driven, and as a result the pull-through resistance of nail 1 is increased.

Figure 4:
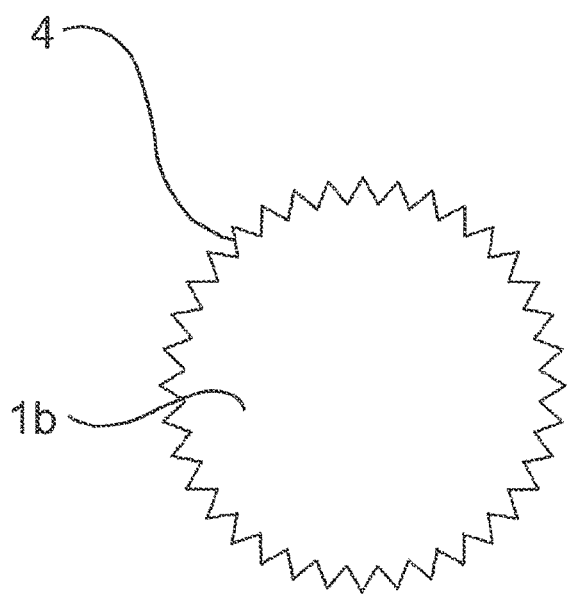

The nail shank 1a and the head area 1c can have a smooth surface. However, the circumferential surface of the nail 1 in the region of the nail shank 1a and the nail head 1c is ribbed in a preferred manner. In other words, the nail shank 1a or nail head 1c is provided with longitudinal grooves 4 which extend over the entire length of the nail shank 1a/of the nail head 1c and are formed here in the form of notches with a triangular cross-section, so that wall sections with trapezoidal (see FIG. 3) or triangular (see FIG. 4) cross-section are formed.

The nails 1 according to the invention are preferably produced individually and then magazined. The nails 1 can be loaded into a nail setting tool either individually or in bulk via a storage container which feeds the nails 1 to a nail setting tool—arranged according to the one-sided alignment of the nail tips 1b. The nails 1 are preferably magazined in coils with a punched (or perforated) tape 6 into which the nails 1 are inserted. During insertion, the nails 1 are pushed out of the punched tape 6 without shearing off the fastener, in this case the punched tape 6. The structure of the perforated tape 6 remains intact and is not shot into the components or distributed around the work area in the form of fragments, as is the case with sheared off fasteners. The undamaged punched tape 6 can either be disposed of as a whole or reused.

The invention claimed is:

1. A nail (1) comprising a nail shank (1a) having:
   a front end provided with a nail tip (1b) in the form of a conical round tip, a tip angle of the nail tip (1b) being greater than 40°;
   a rear end region forming a head region (1c); and
   at least one recess (2) extending in the axial direction of the nail shank (1a) and provided in an upper end face of the head region (1c), the at least one recess configured to receive a wedge (3) therein driven axially into the at least one recess in order to press outwards the material webs of the head region (1c) present adjacent to the at least one recess.

2. The nail (1) according to claim 1, wherein the tip angle of the nail tip (1b) is in the range of 45° and 60°.

3. The nail (1) according to claim 1, wherein longitudinal grooves (4) are formed on an outer peripheral surface of the nail shank (1a), and wherein the longitudinal grooves (4) extend parallel to one another and to the longitudinal axis of the nail shank (1a).

4. The nail (1) according to claim 3, wherein the longitudinal grooves (4) extend over the entire length of the nail shank (1a) and/or are formed in the form of notches of approximately triangular cross-section.

5. The nail (1) according to claim 4, wherein the longitudinal grooves (4) are distributed evenly along the periphery of the nail shank (1a).

6. The nail (1) according to claim 1, wherein the nail is made of wood and/or an organically bonded wood material.

7. The nail (1) according to claim 6, wherein the organically bonded wood material contains phenolic resin as a synthetic resin.

8. The nail (1) according to claim 7, wherein the organically bonded wood material contains synthetic resin in an amount of at least 30% by weight.

9. The nail (1) according to claim 8, wherein the organically bonded wood material contains synthetic resin in an amount of at least 35% by weight.

10. The nail (1) according to claim 9, wherein the organically bonded wood material contains synthetic resin in an amount of 40% by weight.

11. The nail (1) according to claim 6, wherein the nail is made of a synthetic resin-bonded laminated wood or a synthetic resin-bonded fibre composite material which contains lignocellulosic fibres from annual plants.

12. The nail according to claim 1, wherein the nail is made of cellulosic material comprising a material with a density >0.65 g/cm$^3$.

13. The nail (1) according to claim 12, wherein the cellulosic material comprises a material with a density >0.85 g/cm$^3$.

14. The nail (1) according to claim 13, wherein the cellulosic material comprises a material with a density >1.0 g/cm$^3$.

15. The nail (1) according to claim 1, wherein the nail shank (1a) has a round, oval or polygonal cross-section.

16. The nail (1) according to claim 15, wherein the diameter or the smallest shaft thickness is 2 mm to 6 mm.

17. The nail (1) according to claim 1, wherein the nail shank (1a) is cut off at an angle of 90° to a shank axis at the head region (1c) thereof opposite the nail tip (1b).

18. The nail (1) according to claim 1, wherein the tip angle of the nail tip (1b) is 45° or 60°.

* * * * *